INVENTOR
JEAN TURCK
BY MAXWELL E. SPARROW
ATTORNEY

INVENTOR
JEAN TURCK
BY MAXWELL E. SPARROW
ATTORNEY

INVENTOR
JEAN TURCK
By MAXWELL E. SPARROW
ATTORNEY

Dec. 20, 1960 J. TURCK 2,965,762

FREQUENCY MODULATION GONIOMETERS AND GYRO-GONIOMETERS

Filed March 1, 1956 5 Sheets-Sheet 4

INVENTOR
JEAN TURCK
By MAXWELL E. SPARROW
ATTORNEY

Dec. 20, 1960 J. TURCK 2,965,762

FREQUENCY MODULATION GONIOMETERS AND GYRO-GONIOMETERS

Filed March 1, 1956

5 Sheets-Sheet 5

INVENTOR
JEAN TURCK
BY MAXWELL E SPARROW
ATTORNEY

United States Patent Office 2,965,762
Patented Dec. 20, 1960

2,965,762

FREQUENCY MODULATION GONIOMETERS AND GYROGONIOMETERS

Jean Turck, 19 Rue de la Gare, Cachan (Seine), France

Filed Mar. 1, 1956, Ser. No. 568,832
8 Claims. (Cl. 250—203)

The present invention relates to frequency modulation goniometers and gyro-goniometers, that is, direction finders in which are generated signals having a frequency influenced by the position of a target or object relative to a reference axis of the apparatus. The arrangement is such that, while the object is on said reference axis, this frequency has a constant value, whereas when the object deviates from said axis, said frequency is periodically modulated about said constant value, the resultant frequency variation providing signals which are a function of the angular position of the object relative to said axis.

Apparatus of this type have been described in the pending U.S. patent application Ser. No. 436,575. These apparatus comprise a photoelectric detector, a passive modulator placed in front of said detector (or combined therewith so as to form a modulating target which in this case performs the function of detector and modulator), an objective lens for projecting on the passive modulator-detector unit an optical image (or electronic image) of the object observed, driving means arranged to produce a relative cyclic movement along a closed path between, on the one hand, the image projected on the modulator and, on the other hand, the modulator (or the modulating target), and an electronic follow-up or control device controlled by the photoelectric detector and by generating means producing signals having a fixed reference frequency. Said generating means are driven by said driving means so that a reference frequency signal corresponds to each cycle of relative movement. In such an apparatus, the arrangement is such that, owing to said relative cyclic movement, the photoelectric detector delivers modulated energy whose frequency for each cycle of movement is, at every instance, a function of the position, relative to the reference axis, of the centre of the closed path along which said cyclic movement occurs.

It has been found that, to obtain greater accuracy in the operation of this type of apparatus, in particular a better linearity of the signal corresponding to an angular position of the object relative to the reference axis and a reduction of image strays, the solid angle (scanning angle) defining the scanning area (on the passive modulator) within which the relative movement between the image of the object and the passive modulator occurs, must be reduced to a small value.

But this has a drawback in that when the object to detect makes a large angle with the optical axis of the objective lens, the image of this object leaves the scanned area on the modulator.

According to the invention, the image scans firstly a large scanning area (pursuit area) which comprises and surrounds a small area and as soon as the image enters said small area in the course of scanning, the scanning of the large area is stopped and the image is maintained in this small area. The pursuit area may be limited by a solid angle comprised between 10 and 20° for example (defined by the dimensions of the objective lens), whereas the scanning area may be defined by a solid angle of 1° for example.

To this end, an apparatus of the type mentioned in said patent application, and improved in accordance with the present invention is characterized in that there are associated with this apparatus, firstly, large area scanning means arranged to move, within the limits of a relatively large solid angle (reception or large-area scanning angle), the image of the object over an area in the central part or zone of which is situated the passive modulator-detector unit (constituting the small scanning area) and, secondly, switching means actuated by said detector and adapted to substitute the electronic follow-up device for said large-area scanning means as soon as the image strikes, in the course of the large-area scanning, said central zone, whereupon said image is maintained in the latter by the action of said electronic device, this central zone being defined by a small solid angle (small-area scanning angle).

In one embodiment of this improved apparatus, in which the relative movement between the image and the passive modulator is produced by a cyclic movement of said modulator, the apparatus is further characterized by the following features:

The modulator, which is of the type having alternately transparent and opaque radial zones, undergoes, while remaining parallel to itself, a circular movement behind a fixed diaphragm having a circular window which circumscribes the small scanning area, the arrangement being such that the circumference described by the centre of the modulator substantially coincides with the periphery of the window of the diaphragm or is exterior thereto.

The passive modulator placed behind the diaphragm is supported by crank-pins of two crank-arms which are parallel to one another and are rotated in synchronism by a motor which also drives the reference frequency generating means, the arrangement being such that there is obtained at least one reference signal for each cycle of movement (complete rotation) of the passive modulator.

The means for scanning the large area and centering the image on the small scanning area comprise two movable mirrors adapted to effect scanning in directions perpendicular to one another and actuated by driving means which are connected by switching means either to electronic oscillating large-area scanning means or to the electronic follow-up small-area scanning device.

The switching means comprise an electromagnetic relay which has two reversing switches and whose coil is controlled by the photoelectric detector, the arrangement being such that, in the absence of a signal from said photoelectric detector, the driving means of the movable mirrors are connected to the large-area scanning oscillating means, but that as soon as a signal appears (as soon as the image falls on the small scanning area) said driving means are connected to the electronic follow-up device, these driving means being once more connected to said oscillating large-area scanning means as soon as there is no longer a signal (as soon as the image disappears or leaves the small scanning area).

In an another embodiment of the apparatus in which the passive modulator is stationary, the scanning being effected by displacement of the image in accordance with a cyclic movement, said apparatus comprises an electronic detector having a tube in which the optical image is transformed into an electron image, and is characterized in that the small scanning area consists of a small target having alternately active and inactive radial elements cyclically scanned by the electronic image whose generating beam is displaced circularly by deflecting means controlled by sinusoidal current generating means, the latter being so arranged that the currents they generate have a phase difference of 90°, thereby producing with the target a modulation of the signal furnished by the detector.

In this electronic arrangement, the apparatus is further characterized by the following features:

There are associated with the small-area scanning deflecting means large-area scanning deflecting and centering means which are supplied with power through switching means.

The switching means are controlled by multivibrators (bi-stable system).

Further features and advantages of the invention will appear from the ensuing description of two embodiments of the invention which are given solely by way of example and are shown diagrammatically in the accompanying drawings in which.

Figures 1, 2, 3, 4:
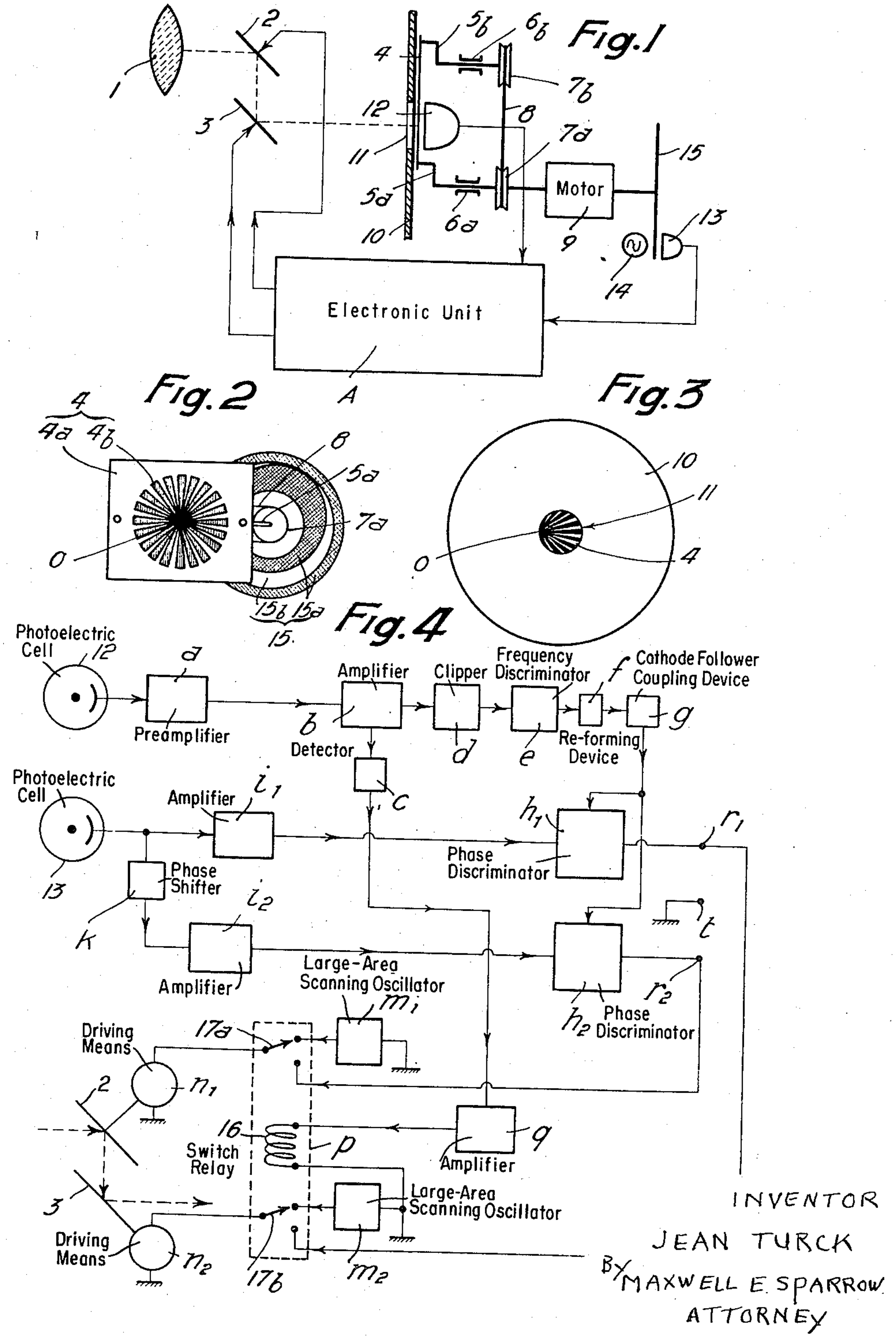
Fig. 1 is a diagrammatic assembly view of an electromechanical apparatus embodying the invention in which the passive modulator is movable.
Fig. 2 is a front view of the movable passive modulator shown in Fig. 1.
Fig. 3 is a front view of the large scanning area surrounding the small scanning area.
Fig. 4 is a block diagram of the electronic device of the apparatus shown in Fig. 1.

It will be recalled that, in the frequency modulation goniometers and gyro-goniometers of the type described in the pending U.S. patent application Ser. No. 436,575, the centre of the passive modulator (of the type having alternately opaque and transparent radial elements) is situated on a reference axis which is generally the optical axis of the objective lens, and the electronic device responsive to frequency variations (which occur when the image of the object describes a closed path, for example a circumference whose centre does not coincide with that of the modulator) is arranged to provide energy for re-positioning the centre of the path of the image centrally of the modulator, this energy being a function of the angular position of the object relative to said reference axis, so that this energy may be utilized for ascertaining said angular position and, by derivation with respect to time, the angular velocity of change in this angular position.

In the mechanical embodiment shown in Figs. 1 to 5, the apparatus comprises (see in particular Figs. 1–3) an objective lens 1 co-operating with two movable mirrors 2 and 3 (arranged, in a known manner, to effect scannings in directions perpendicular to one another, that is to say to perform a sweeping across a surface) so as to project on the surface of a passive modulator 4 the image of the object to be observed. This passive modulator consists of a rigid flat transparent support 4a on which are disposed narrow opaque sectors 4b angularly spaced apart so as to constitute a radial system having alternately transparent and opaque elements.

The modulator 4 is supported by the crank-pins of two crank-arms 5a and 5b, which have the same length and are journalled at 6a and 6b respectively. The axes of the crank-arms 5a and 5b carry identical pulleys 7a and 7b interconnected by a belt 8. The crank-arm 5a is driven by a constant-speed motor 9.

Disposed in front of the modulator 4 is the large scanning area formed by a screen or diaphragm 10 provided with a central circular window 11 whose diameter is twice the radius of the crank-arms 5a and 5b, the arrangement being such that the periphery of the window 11, which in fact defines the small scanning area, is in axial alignment with the circular path described by the centre 0 of the modulator which undergoes a movement of circular translation while remaining parallel to itself; furthermore, the total distance between the elements 1—2—3—4 is substantially equal to the focal length of the objective lens 1.

Disposed behind the passive modulator 4 is a photoelectric cell 12 connected to an electronic unit A which will be described in detail hereinafter.

It will be seen that, if the image projected on the modulator 4 strikes the centre of the small scanning area, the constant-speed circular translation of the modulator 4 causes a periodic excitation of the cell in accordance with a constant frequency (equal to the product of the number of opaque elements 4b of the modulator and the velocity of translation of the latter, that is, the rotational velocity of the crank-arms 5a, 5b).

Now, if the image is projected off the centre of the small scanning area, the frequency of excitation of the cell would no longer be consant but modulated about the constant value.

A fixed reference frequency is supplied to the device A by an alternating current generator comprising a photoelectric cell 13 which receives a beam of light from a light source 14 of constant intensity through a modulating disk 15 driven by the motor 9, this disk comprising a crescent-shaped transparent zone 15b bounded by two opaque zones 15a.

The device A comprises an assemblage of elements diagrammatically represented in Fig. 4.

The photoelectric cell 12 is connected to a preamplifier *a* whose output is connected to the input of an amplifier *b* connected to a detector *c* and a clipper *d*. Following on the latter in succession, are a frequency discriminator *e*, a re-forming device *f* for putting the signals supplied by the discriminator *e* in form, and a cathode-follower coupling device *g*. The frequency discriminator *e* is so arranged as to supply no voltage when the signals from the cell 12 have constant frequency.

The coupling device *g* is connected in parallel to two phase discriminators *h*1 and *h*2 to which are also supplied reference-frequency signals from the photoelectric cell 13. The reference signals reach the phase discriminator *h*1 through an amplifier *i*1 and the phase discriminator *h*2 through a phase shifter *k* and an amplifier *i*2, the phase shifter *k* being arranged to shift the phase of the signals $$\frac{\pi}{2}$$

According to a feature of the invention, the electronic device A further comprises two large-area scanning oscillators *m*1 and *m*2 so arranged as to deliver scanning current able to control the movable mirrors 2 and 3, so that the latter perform oscillations of relatively great amplitude.

The movable mirrors 2 and 3 are each controlled by driving means *n*1 and *n*2 supplied through a switch relay *p*, the control coil 16 of which is excited by the detector *c* through an amplifier *q*. This coil actuates the movable brushes 17a and 17b to which the driving means *n*1 and *n*2 are connected.

The driving means *n*1 and *n*2 may be galvanometers having an elastic return frame when the follow-up is effected with non-zero error. The value of the angular position of the object is then read off from the "centering" current in the galvanometers.

The driving means *n*1 and *n*2 may also consist of integrating fluxmeters having a free frame (without elastic return) when the follow-up is effected with zero error. Linear control micromotors could also be used.

The value of the angular position is given by the angular displacement of the mirrors.

In the absence of a signal from the photoelectric cell 12 the control coil 16 of the switch relay *p* is not energized (the devices *a, b, c* and *q* are at rest) and the brushes 17*a*, 17*b* co-operate with the contacts connected to the large-area scanning oscillators *m*1 and *m*2. The mirrors 2 and 3 (whose movements are controlled by these oscillators) cause the light beam to scan the entire large scanning area 10. As soon as an object appears and as soon as its image (provided by the objective lens 1), in the course of the large-area scanning produced by the oscillators *m*1 and *m*2, strikes the small scanning area defined by the window 11 in the screen 10, the signals supplied by the cell 12 enter the amplifier *q* through the detector *c*; this amplifier actuates the relay *p* and the brushes 17*a* and 17*b* of the latter enter into contact with contacts connected to the phase discriminators *h*1 and *h*2.

When this occurs, the driving means *n*1 and *n*2 of the movable mirrors 2 and 3 so move the mirrors under the control of the phase discriminators as to maintain the image of the object automatically in the small scanning area.

If the image of the object leaves the small scanning area, the cell 12 no longer receives a signal and, as the coil 16 of the relay *p* becomes non energized the mirrors are once again controlled by the large-area scanning oscillators *m*1 and *m*2, resulting in a scanning of the entire large scanning area 10.

Figure 5:
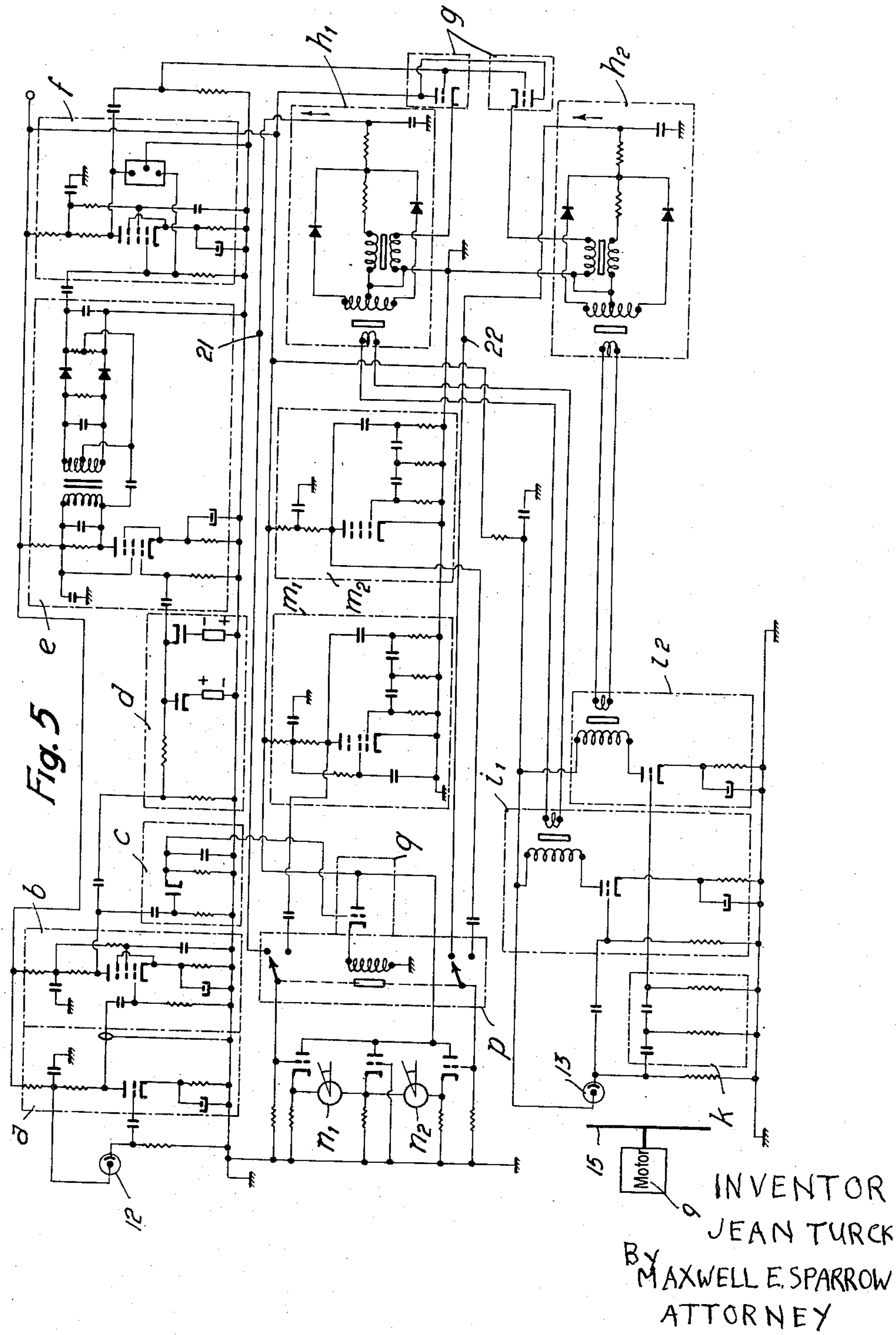
Fig. 5 is a complete electric diagram of said electronic device.
Figure 6:
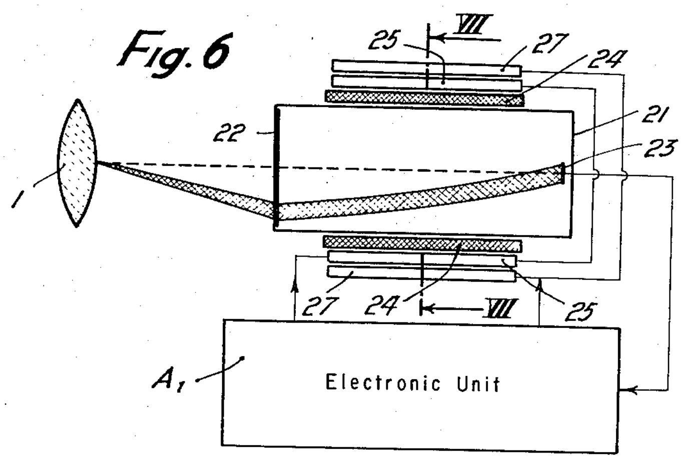
Fig. 6 is a diagrammatic assembly view of an electronic apparatus embodying the invention comprising an image-transforming tube and in which the passive modulator is fixed.

By way of example, a detailed diagram of the different elements shown in the block diagram of Fig. 4 have been shown in Fig. 5. In the latter, the same elements as those used in Fig. 4 have been designated by the same reference characters. As all the elements are constructed in a manner well known in the art, there is no need to describe them in detail, the diagram of Fig. 5 being sufficiently explicit.

It should be mentioned that the large-area scanning oscillators *m*1 and *m*2 are adapted to control the mirrors 2 and 3 (when they are connected to the driving means *n*1 and *n*2 of these mirrors) in such manner that the latter cause respectively a horizontal and vertical scanning of the large scanning area 10.

In the course of the actual scanning the electronic device A operates in the following manner:

If the image of the object is formed exactly in the centre of the window 11, the uniform circular translation of the modulator 4 causes the cell 12 to receive energy modulated at a constant frequency for each cycle of displacement of the modulator. The frequency discriminator *e* is set to this constant frequency and therefore supplies no voltage to the phase discriminators *h*1, *h*2 and the latter supply no voltage to the driving means *n*1 and *n*2 of the mirrors 2 and 3.

If the object deviates from the reference axis so that the image is projected away from the centre of the window 11, in each scanning cycle (cycle of movement of the modulator 4), the cell 12 receives energy modulated at a non-constant or modulated frequency and the discriminator *e* supplies a certain voltage to the phase discriminators *h*1 and/or *h*2. But these phase discriminators also receive a reference frequency from the cell 13, each period of this frequency corresponding to a complete cycle of movement of the modulator 4, since the light beam received by the cell 13 is modulated by the disk 15 which rotates in synchronism with the crank-arms 5*a* and 5*b* that cause the movement of circular translation of the modulator 4. The voltages supplied by the cell 13 and amplified by the amplifier *i* are applied directly to the phase discriminator *h*1 and are applied, shifted in phase $$\frac{\pi}{2}$$

by the phase shifter *k*, to the phase discriminator *h*2. The said phase discriminators therefore have, at their outputs, voltages corresponding to the co-ordinates (along the *x* and *y* axes) of the object displaced relative to the optical axis of the objective lens 1. The voltages received at the terminals *r*1 and *r*2 may be utilized for measuring purposes or in a follow-up control or servo-mechanism (for example a pilot control for constantly pointing a machine supplied with the apparatus in the direction of a moving object or target).

By derivation with respect to time, the voltages at the terminals *r*1 and *r*2, would supply the velocity of change in the angular position of the object relative to the reference axis.

The advantage of the apparatus described above over that described in the pending U.S. patent application Ser. No. 436,575 is the following. When the angular distances between the object and the reference axis, for example the optical axis of the objective lens 1, are large, it is noticed that the voltages at the terminals *r*1 and *r*2 are not proportional to these distances. In the apparatus embodying the present invention, the small scanning area is relatively small (window 11) and the voltages at the terminals *r*1 and *r*2 are practically proportional to the angular positions of the object of this area.

Many modifications of detail may be made in the apparatus shown in Figs. 1 to 5. Thus the signals modulated at the reference frequency could be produced by two photoelectric cells angularly spaced 90° apart (instead of one cell 13) which would permit eliminating the phase shifter *k*, each cell being associated with one of the phase discriminators.

In the embodiment shown in Figs. 6 to 10, the apparatus is also arranged to effect first a large-area scanning followed by a small-area scanning and follow-up. However, in this embodiment, the mechanical means (to effect the scanning and supply the reference frequency) and the electromagnetic means (for switching the control of the mirrors) are eliminated and their functions are performed by electronic means.

Further, the passive modulator is stationary and it is the image of the object which, in the course of the scanning, is displaced circularly over the modulator.

In this electronic arrangement, the apparatus comprises a photoelectric detector formed by a vacuum tube 21 whose one end carries a semi-transparent photocathode 22 disposed in the focal plane of the objective lens 1, the latter projecting the optical image of the object to be observed on to the photocathode. Disposed at the end of the tube, remote from that having the photocathode, is a receiving target 23 formed of alternately active and inactive radial elements, this target thus performing simultaneously the functions of a photoelectric detector and of a passive modulator having radial elements.

The optical image projected by the objective lens 1 on the photocathode 22 is transformed in the latter into an electron image. The resultant electron beam is projected and focused toward the opposite end of the tube (that end having the target 23) by a conventional electron lens which, for the sake of clarity, has been shown in the form of a magnetic concentration lens 24.

The target 23 is connected to an electronic unit A1 which will be described in detail hereinafter and which supplies circular scanning energy to two pairs of deflecting coils 25, 26 of the tube 21 (these coils are disposed 90° apart relative to the axis of the tube). Superimposed on or surrounding these coils are two other pairs of deflecting coils 27 and 28 supplied by the electronic unit A1 for effecting the large-area scanning and the centering of the image on the target 23 during the small-area scanning. These deflecting coils assume the same functions as the two movable mirrors 2 and 3 shown on Figs. 1 and 4.

The electronic unit A1 comprises (see Fig. 8) a pre-amplifier *a* followed by an amplifier *b* which is connected to a detector $c$ and to a clipper $d$ at the output of which are disposed, one after the other, a frequency discriminator $e$, a re-forming device $f$ for putting the signals from the frequency discriminator in form, and, in parallel, two cathode-follower coupling devices $g$ connected with two phase discriminators $h1$ and $h2$. These phase discriminators receive a reference frequency furnished by an alternating current generator comprising a master oscillator $m3$ which is connected directly to the phase discriminator $h1$ and connected to the phase discriminator $h2$ through a phase shifter $k$.

The elements $m3$ and $k$ are also connected to circular scanning coils 25 and 26 through amplifiers $s1$ and $s2$ so that a scanning cycle of the target 23 corresponds to one period of circular scanning.

The energy for large-area scanning is supplied by the large-area scanning oscillators $m1$ and $m2$.

The scanning coils 27 and 28 may be fed through a switch-amplifier unit $p'+q'$ either by the oscillators $m1$ and $m2$ (in which case the image is displaced over the entire large scanning area constituted by the plane containing the target 23) or by the phase discriminators $h1$ and $h2$ as soon as the detector $c$ receives a signal resulting from the scanning of the target 23 by the image (which sets up the small-area scanning); these phase discriminators therefore tend to maintain the image on the target 23, this image in the course of scanning describing a circular path on the target thereby modulating the energy supplied to the preamplifier $a$.

Figure 8:
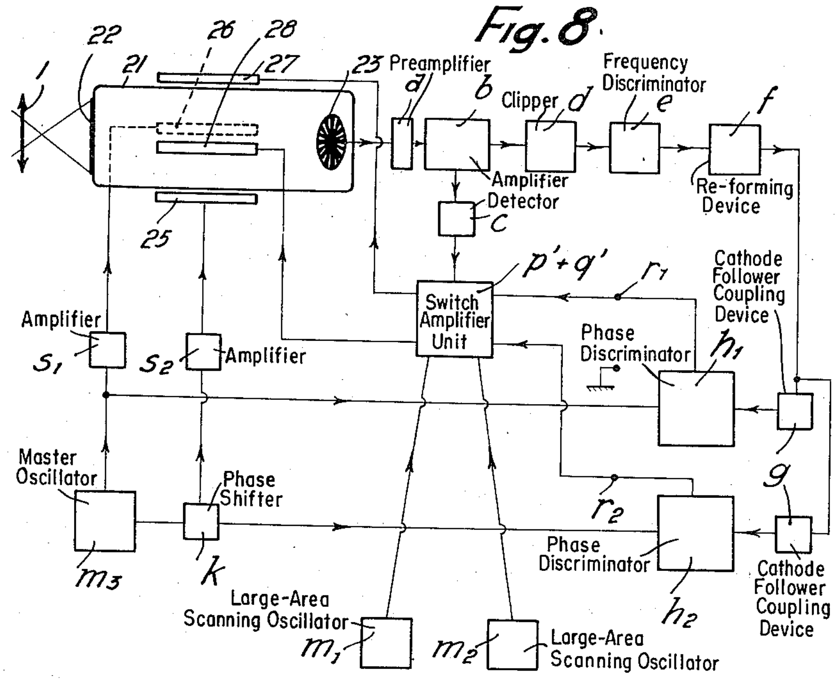
Fig. 8 is a block diagram of the electronic device of the apparatus shown in Fig. 6, and Figs. 9 and 10 are two halves (complementary to each other) of the complete diagram of the electronic device shown in Fig. 8.
Figure 7:
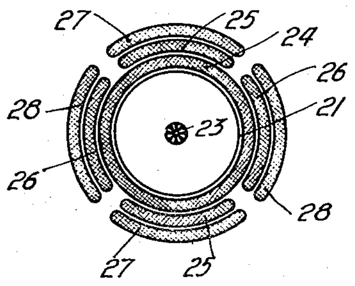
Fig. 7 is a sectional view taken along line VIII—VIII of Fig. 6 of the image-transforming tube.
Figure 9:
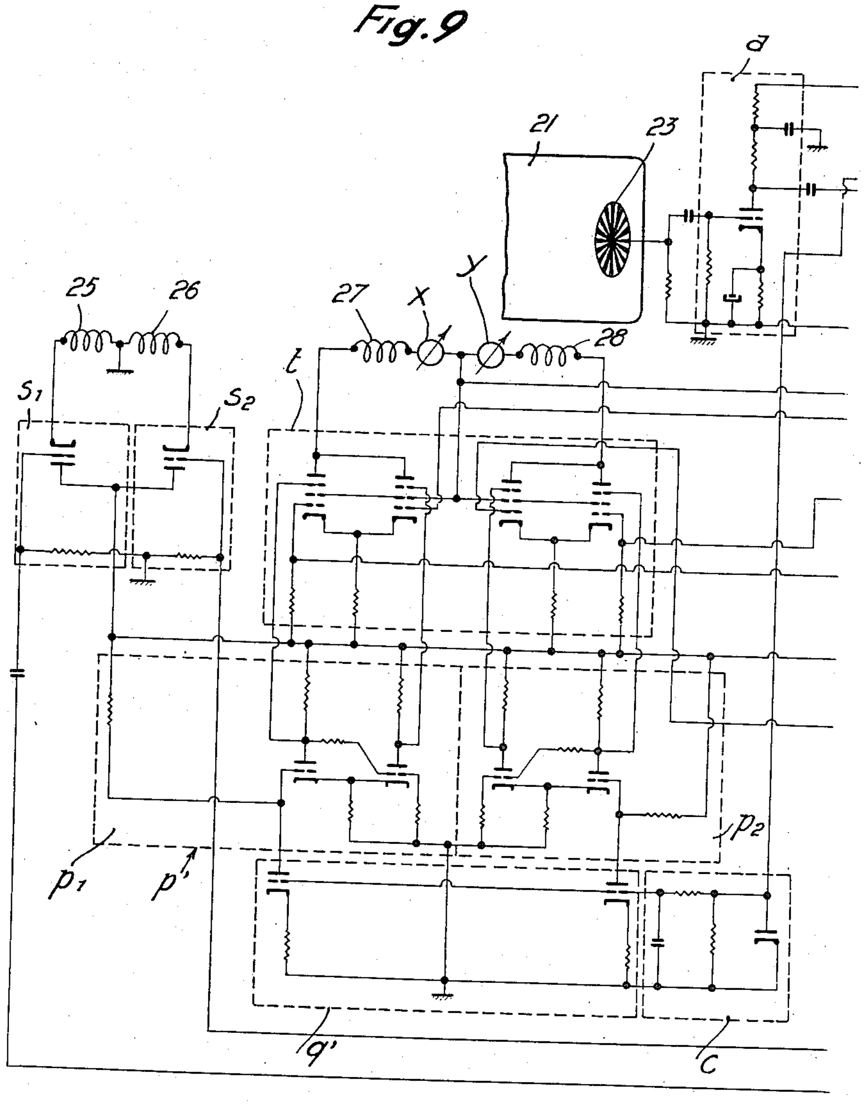
Figure 10:
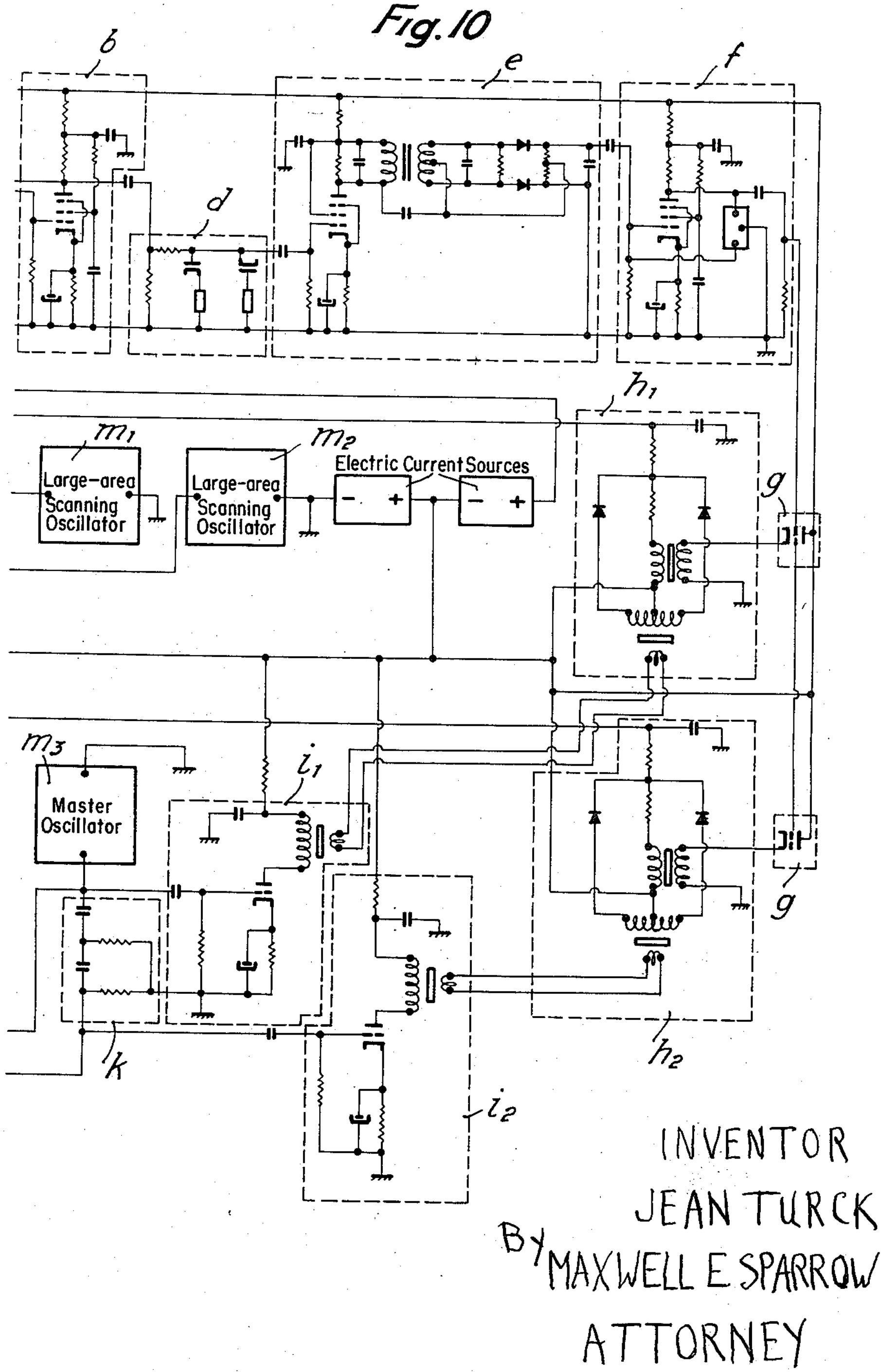

By way of example, a detailed diagram of the various elements shown in the block diagram of Fig. 8 are shown in Figs. 9 and 10 (to be considered as two halves of one large diagram, Fig. 10 being on the right of Fig. 9). The various elements of Figs. 9 and 10 are designated by the same reference characters as like elements used in Fig. 8. As these elements are constructed in the manner well known in the art, there is no need to describe them in detail, the diagram of Figs. 9 and 10 being sufficiently explicit.

It should be mentioned that the scanning oscillators $m1$, $m2$ are similar to those shown in Fig. 5 and that the master oscillator $m3$ is a tube oscillator of any appropriate type known in the art.

It will also be noticed that there are provided in the diagram of Figs. 9 and 10, as in the embodiment shown in Fig. 5, two amplifiers $i1$ and $i2$ adapted to amplify the signals sent by the master oscillator $m3$ and the phase shifter $k$ to the phase discriminators $h1$ and $h2$.

The switching device $p'$ is connected to the deflecting coils 27, 28 (large-area scanning and centering follow-up) through an amplifier $t$ (Fig. 9).

The switching device $p'$ in this embodiment is not of the contact relay type of the embodiment shown in Figs. 1–5, but of the purely electronic type. It comprises two multivibrators $p1$ and $p2$, each of which is formed of two triodes coupled together so as to form a bi-stable system, each system comprising a triode controlled by the detector $c$, the anode thereof being coupled to the grid of the other triode, so that in the absence of signals received by the detector $c$, the coils 27 and 28 are fed by the large-area scanning oscillators $m1$ and $m2$, and when the detector receives the signals, these coils are fed by the phase discriminators $h1$ and $h2$.

In the course of the actual scanning, the electronic device A1 operates in the following manner:

If the oscillator $m3$ and the coils 25, 26 cause the image to describe on the target 23 a circumference whose centre exactly coincides with that of said target, the preamplifier $a$ receives a voltage modulated at a constant frequency for each circular scanning cycle. The frequency discriminator $e$ is set to this constant frequency and applies no voltage to the phase discriminators $h1$ and $h2$ and the latter supply no energy to the deflecting coils 27, 28.

If the object assumes such angular position relative to the reference axis (the optical axis of the objective lens 1) that the centre of the circular scanning path moves away from the centre of the target 23, the modulation frequency furnished by the target 23 is no longer constant but varies in each scanning cycle about the said constant frequency. Thus, the frequency discriminator $e$ supplies a certain voltage to the phase discriminators $h1$ and $h2$, but as the latter also receive a reference frequency supplied by the master oscillator $m3$, they supply to the coils 27 and 28 voltages corresponding to the co-ordinates of the object which has moved relative to the optical axis of the objective lens 1. These voltages, which appear at the terminals $r1$ and $r2$, may be utilized for measuring purposes or in a follow-up control or servomechanism.

By derivation with respect to time, the voltages at the terminals $r1$ and $r2$ indicate the velocity of change in the angular position of the object relative to the reference axis.

The measurements (or the energy necessary for driving control devices) may also be obtained by means of intensity measuring devices $x$ and $y$ series connected with the coils 27, 28.

Although specific embodiments of the invention have been hereinbefore described, many modifications and changes may be made therein without departing from the scope of the invention as defined in the appended claims.

What I claim is:

1. In an apparatus of the class of the direction finders for observing a target and comprising: objective lens means for producing, in the apparatus, an image of the target on an image plane surface; means for producing a relative movement, along a closed circular path between said image and the image plane surface; means sensible to said image and to its relative movement with respect to the image plane surface for delivering successive electric signals the frequency of which is a function of the position of the center of the path, relative to a reference axis of the apparatus, of said image on said image plane surface; an alternating current generator coupled with the said means producing the said relative movement, so as to work in synchronism therewith; deflecting means located in front of the said image plane surface for controlling the relative position of the path of the image with respect to the reference axis; and an electronic unit comprising a frequency discriminator connected to the means producing the electric signals, two phase discriminators connected to the frequency discriminator and to the alternating current generator and connectable to the said deflecting means in order to control the latter in response to the position of the center of the image path with respect to the reference axis; the provision of control means for large-area sweeping of the image and switching means controlled from the means producing the electric signals, for connecting said deflecting means firstly to the control means for large-area sweeping and then, as soon as an image appears on the signal producing means, to the said phase discriminator, so that the image begins to move on a large scanning area which is greater than but comprises the area of the means delivering electric signals and a surface surrounding the latter area, and then remains on said latter area as soon as it encounters the said latter area.

2. The structure as claimed in claim 1, wherein the means sensible to the image and to its relative movement comprise a photoelectric detector and a passive modulator located in front of said photoelectric detector and the image plane and having radial opaque sectors staggered with non opaque sectors.

3. The structure as claimed in claim 1, wherein the deflecting means comprise driving means supplied, through the switching means, either by the control means for large-area sweeping or by the phase discriminators of the electronic unit, and movable mirrors positively connected with said driving means to be actuated by the latter and adapted to effect scannings in directions perpendicular to one another.

4. The structure as claimed in claim 2, further comprising a fixed diaphragm whose surface area corresponds substantially to the large sweeping area and having a circular window located in front of the passive modulator, the reference axis passing through the center of said window, and wherein the means for producing a relative movement between said image and the image plane are adapted to move the passive modulator so that it describes, while remaining parallel to itself in the image plane, such a circular movement that the center of said modulator describes a circumference which substantially coincides with the peripheral edge of the circular window.

5. The structure as claimed in claim 4, wherein the means for moving the passive modulator behind the window in the diaphragm comprise two crank-arms having parallel axes of rotation and which support the passive modulator, and a constant-speed motor which is connected to the crank-arms so as to rotate the latter and also drives the alternating current generator.

6. The structure as claimed in claim 2, wherein the switching means comprise an electromagnetic relay having two reversing switches and a control coil, the two reversing switches being adapted to connect said deflecting means either to the large-area scanning control means or to the phase discriminators of the electronic unit, said coil being connected to the photoelectric detector so as to be controlled thereby, the arrangement being such that, in the absence of a signal from said detector, the deflecting means are connected to the large-area scanning control means, but as soon as a signal appears, due to the fact that in the course of scanning the image falls on the passive modulator, said deflecting means are connected to the phase discriminators of the electronic unit.

7. The structure as claimed in claim 5, wherein the alternating current generator comprises a modulating disk, actuated by said constant speed motor, a source of constant light disposed on one side of the disk, a photoelectric cell located on the other side of the disk and having two outputs, and a phase shifter connected with one of the outputs in such manner that two voltages having a phase difference of 90° may be delivered at the output of the generator in order to be respectively applied to the two phase discriminators.

8. The structure as claimed in claim 1, wherein said electronic unit further includes: a channel between the means producing the electric signals and the frequency discriminator and comprising a preamplifier, an amplifier and a clipper; a detector and amplifying means connected between said amplifier and the switching means; a reforming device and a cathode follower coupling device inserted between the frequency discriminator and the phase discriminators.

References Cited in the file of this patent

UNITED STATES PATENTS

| | | |
|---|---|---|
| 2,352,179 | Bolsey | June 27, 1944 |
| 2,430,924 | Fowle et al. | Nov. 18, 1947 |
| 2,431,510 | Salinger | Nov. 25, 1947 |
| 2,600,168 | Klyce | June 10, 1952 |
| 2,659,828 | Elliott | Nov. 17, 1953 |
| 2,673,318 | Beitz | Mar. 23, 1954 |
| 2,702,494 | Lieneweg et al. | Feb. 22, 1955 |
| 2,713,134 | Eckweiler | July 12, 1955 |
| 2,825,021 | Friend | Feb. 25, 1958 |